US012606730B2

(12) United States Patent
Kusano et al.

(10) Patent No.: US 12,606,730 B2
(45) Date of Patent: Apr. 21, 2026

(54) COOLANT COMPOSITION AND CONCENTRATED COOLANT COMPOSITION

(71) Applicants: TOYOTA JIDOSHA KABUSHIKI KAISHA, Toyota (JP); JAPAN CHEMICAL INDUSTRIES Co., Ltd., Shizuoka (JP)

(72) Inventors: Yuya Kusano, Nagoya (JP); Masao Watanabe, Okazaki (JP); Taiki Nakamura, Nagoya (JP); Takumi Otsubo, Fujieda (JP); Yoichiro Yoshii, Shizuoka (JP); Nobukazu Takagi, Shizuoka (JP); Yu Sasaki, Shizuoka (JP)

(73) Assignees: TOYOTA JIDOSHA KABUSHIKI KAISHA, Toyota (JP); JAPAN CHEMICAL INDUSTRIES Co., Ltd., Shizuoka (JP)

( * ) Notice: Subject to any disclaimer, the term of this patent is extended or adjusted under 35 U.S.C. 154(b) by 527 days.

(21) Appl. No.: 17/928,768

(22) PCT Filed: Aug. 12, 2021

(86) PCT No.: PCT/IB2021/057442
§ 371 (c)(1),
(2) Date: Nov. 30, 2022

(87) PCT Pub. No.: WO2022/034534
PCT Pub. Date: Feb. 17, 2022

(65) Prior Publication Data
US 2023/0212446 A1 Jul. 6, 2023

(30) Foreign Application Priority Data
Aug. 13, 2020 (JP) ................................. 2020-136631

(51) Int. Cl.
*C09K 5/10* (2006.01)
*C09K 5/20* (2006.01)
*C23F 11/14* (2006.01)
(52) U.S. Cl.
CPC .................. *C09K 5/10* (2013.01); *C09K 5/20* (2013.01); *C23F 11/149* (2013.01)

(58) Field of Classification Search
CPC ... C09K 5/10; C09K 5/20; C23F 11/08; C23F 11/10; C23F 11/14; C23F 11/146; C23F 11/149; C23F 11/167; C23F 11/182; C23F 11/184; C23F 11/187; C23F 11/188
See application file for complete search history.

(56) References Cited

U.S. PATENT DOCUMENTS

| | | | | |
|---|---|---|---|---|
| 4,731,128 A | * | 3/1988 | Casullo | C23F 11/149 |
| | | | | 148/269 |
| 4,772,408 A | * | 9/1988 | Mohr | C09K 5/20 |
| | | | | 252/78.3 |
| 5,366,651 A | * | 11/1994 | Maes | C09K 5/20 |
| | | | | 252/75 |
| 5,723,061 A | * | 3/1998 | Ciardi | C09K 5/20 |
| | | | | 252/75 |
| 6,508,951 B1 | | 1/2003 | Mori et al. | |
| 8,613,866 B1 | * | 12/2013 | Yang | C09K 5/10 |
| | | | | 252/75 |
| 2006/0027782 A1 | | 2/2006 | Wenderoth et al. | |
| 2014/0070134 A1 | * | 3/2014 | Woyciesjes | C09K 5/10 |
| | | | | 252/75 |
| 2020/0017745 A1 | | 1/2020 | Dietl et al. | |

FOREIGN PATENT DOCUMENTS

| | | | | | |
|---|---|---|---|---|---|
| EP | 2374859 A2 | * | 10/2011 | ............ | C23F 11/149 |
| JP | 07-278855 A | | 10/1995 | | |
| JP | 2001-072967 A | | 3/2001 | | |
| JP | 2006-510168 A | | 3/2006 | | |
| JP | 2011079712 A | | 4/2011 | | |
| KR | 10-2019-0083522 A | | 7/2019 | | |
| KR | 20190083522 A | * | 7/2019 | ............... | C09K 5/10 |

OTHER PUBLICATIONS

Ethylene Glycol SDS (Year: 2010).*
Phosphoric Acid 40% v/v SDS (Year: 2015).*
Benzimidazole SDS (Year: 2016).*

* cited by examiner

*Primary Examiner* — Matthew R Diaz
(74) *Attorney, Agent, or Firm* — Dinsmore & Shohl LLP

(57) ABSTRACT

A coolant composition containing the following substances: a) an alcohol; b) water; c1) a triazole compound; c2) an imidazole compound; d) a phosphate ion; and e) a metasilicate.

9 Claims, 1 Drawing Sheet

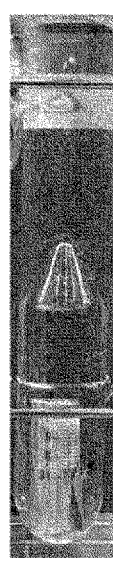

COOLANT COMPOSITION AND CONCENTRATED COOLANT COMPOSITION

CROSS-REFERENCE TO RELATED APPLICATIONS

The present application is the National Phase entry of International Patent Application No. PCT/IB2021/057442 filed Aug. 12, 2021, which claims priority to Japanese Patent Application No. 2020-136631 filed Aug. 13, 2020.

BACKGROUND

1. Technical Field

The present disclosure relates to a coolant composition and a concentrated coolant composition, and, in particular, relates to a coolant composition for an automobile having a battery.

2. Description of Related Art

In automobiles, a coolant is used to cool the engine and the like, and in automobiles having a battery as well, a coolant is used to cool the battery and the like. The coolant used to cool the battery is required to have various properties, such as low electrical conductivity and high corrosion prevention. However, rust inhibitors used to improve corrosion prevention generally increase the electrical conductivity of a coolant, and it is thus difficult to simultaneously achieve both low electrical conductivity and high corrosion prevention in a coolant. Also, when the aluminum corrosion prevention (corrosion prevention with respect to aluminum) of a coolant is insufficient, hydrogen is produced due to aluminum corrosion, possibly resulting in an increased hydrogen concentration and a lowered liquid level in the reserve tank.

Coolant compositions containing various components are known. For example, Japanese Unexamined Patent Application Publication No. 7-278855 and Japanese Unexamined Patent Application Publication (Translation of PCT application) No. 2006-510168 disclose coolant compositions containing azoles such as triazole and imidazole. Japanese Unexamined Patent Application Publication No. 2001-72967 discloses a coolant composition containing phosphoric acid or an alkali metal salt thereof. Japanese Unexamined Patent Application Publication No. 2011-79712 discloses that hydrogen production can be terminated by adding phosphoric acid to a hydrogen generation system.

However, the above coolant compositions have room for improvement with respect to satisfying all of the low electrical conductivity, high corrosion prevention, and low hydrogen producibility.

SUMMARY

As described above, the above coolant compositions have room for improvement with respect to satisfying all of the low electrical conductivity, high corrosion prevention, and low hydrogen producibility. Accordingly, an aspect of the present disclosure provides a coolant composition having low electrical conductivity, high corrosion prevention, and low hydrogen producibility.

The present inventors have found that a coolant composition has all of the low electrical conductivity, high corrosion prevention, and low hydrogen producibility due to the combination of a triazole compound, an imidazole compound, and a phosphate ion.

(1) A first aspect of the present disclosure relates to a coolant composition containing the following substances:
    a) an alcohol;
    b) water;
    c1) a triazole compound;
    c2) an imidazole compound;
    d) a phosphate ion; and
    e) a metasilicate.

(2) The ratio of a content of the imidazole compound to a content of the triazole compound may be less than 0.1.

(3) The pH of the coolant composition may be 5.5 to 9.0.

(4) The composition may be for a cooling circuit including a battery.

(5) The electrical conductivity of the coolant composition may be 200 $\mu$S/cm or less at 25° C.

(6) A second aspect of the present disclosure relates to a concentrated coolant composition for obtaining the coolant composition of the first aspect, which is used after being diluted with water.

(7) A third aspect of the present disclosure relates to a concentrated coolant composition including:
    an alcohol;
    a triazole compound;
    an imidazole compound; and
    a phosphate ion.

The aspects of the present disclosure make it possible to provide a coolant composition having low electrical conductivity, high corrosion prevention, and low hydrogen producibility.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 1 shows an apparatus used in the hydrogen producibility test in the Examples.

DETAILED DESCRIPTION OF EMBODIMENTS

Embodiments of the present disclosure will now be described in detail below.

The coolant composition of an embodiment of the present disclosure contains the following substances: a) an alcohol; b) water; c1) a triazole compound; c2) an imidazole compound; d) a phosphate ion; and e) a metasilicate. In the coolant composition of the present embodiment, due to the combination of a triazole compound, an imidazole compound, and a phosphate ion, high metal corrosion prevention (high corrosion prevention with respect to metal) and low hydrogen producibility can be simultaneously achieved while maintaining low electrical conductivity.

In the coolant composition of the present embodiment, an alcohol (component a)) and water (component b)) are used as base materials.

An alcohol functions as a freezing point lowering agent and has antifreezing properties. The alcohol may be, for example, at least one alcohol selected from the group consisting of monohydric alcohols, dihydric alcohols, trihydric alcohols, and glycol monoalkyl ether.

Monohydric alcohol may be, for example, one or a mixture of two or more selected from methanol, ethanol, propanol, butanol, pentanol, hexanol, heptanol, and octanol.

Dihydric alcohol may be, for example, one or a mixture of two or more selected from ethylene glycol, diethylene glycol, triethylene glycol, propylene glycol, 1,3-propanediol, 1,4-butanediol, 1,3-butanediol, 1,5-pentanediol, and hexylene glycol.

Trihydric alcohol may be, for example, one or a mixture of two or more selected from glycerin, trimethylolethane, trimethylolpropane, 5-methyl-1,2,4-heptanetriol, and 1,2,6-hexanetriol.

Glycol monoalkyl ether may be, for example, one or a mixture of two or more selected from ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, and tetraethylene glycol monobutyl ether.

Among the above alcohols, ethylene glycol, propylene glycol, and 1,3-propanediol are used in some embodiments from the viewpoint of handleability, cost, and availability, and in some embodiments ethylene glycol is used.

In some embodiments, the alcohol content in consideration of antifreezing properties is 20% by mass to 80% by mass, 30% by mass to 70% by mass, or 40% by mass to 60% by mass, based on the mass of the base materials.

As for water, for example, ion-exchanged water and distilled water may be used. In some embodiments, the water content is 20% by mass to 80% by mass, 30% by mass to 70% by mass, or 40% by mass to 60% by mass, based on the mass of the base materials.

The coolant composition of the present embodiment contains a triazole compound (component c1)). Due to the triazole compound contained in the coolant composition, metal corrosion prevention (in particular, aluminum and steel corrosion prevention) is improved, and hydrogen producibility is lowered as well.

The triazole compound is not particularly limited; for example, aromatic triazole or alkyl-substituted aromatic triazole may be used, and, in some embodiments, benzotriazole and tolyltriazole may be used.

In the coolant composition of some embodiments, the triazole compound content is 0.05% by mass to 1.0% by mass, or 0.05% by mass to 0.5% by mass, with the base materials being 100% by mass. When the triazole compound content is within this range, high aluminum and steel corrosion prevention and low hydrogen producibility are achieved while maintaining low electrical conductivity.

The coolant composition of the present embodiment contains an imidazole compound (component c2)). Due to the imidazole compound contained in the coolant composition, metal corrosion prevention (in particular, steel corrosion prevention) is improved.

The imidazole compound is not particularly limited; for example, imidazole, alkyl- or aryl-substituted imidazole, and condensed imidazole may be used, in some embodiments, imidazole, alkyl-substituted imidazole, and benzimidazole may be used, and in some embodiments, alkyl-substituted imidazole is used, and in some embodiments, 1-methylimidazole may be used.

In the coolant composition of some embodiments, the imidazole compound content is 0.0005% by mass to 0.09% by mass, or 0.0005% by mass to 0.04% by mass, with the base materials being 100% by mass. When the imidazole compound content is within this range, sufficiently low electrical conductivity and high steel corrosion prevention are achieved.

In the coolant composition of some embodiments, the ratio of the imidazole compound content to the triazole compound content (c2/c1) is less than 0.1, 0.01 or more and less than 0.1, 0.04 or more and less than 0.1, 0.06 or more and less than 0.1, or 0.08 or more and less than 0.1. When c2/c1 is less than 0.1, the electrical conductivity of the coolant composition is significantly lowered while maintaining high metal corrosion prevention.

The coolant composition of the present embodiment contains a phosphate ion (component d)). Due to the phosphate ion contained in the coolant composition, production of hydrogen from aluminum can be suppressed.

As for the coolant composition of the present embodiment, the compound that produces a phosphate ion is not particularly limited, and examples include phosphoric acid and salts thereof. In some embodiments, the compound that produces a phosphate ion is phosphoric acid and an alkali metal salt thereof, and in some embodiments, is phosphoric acid.

In the coolant composition of in some embodiments, the phosphate ion content (the content in terms of P) is 0.0005% by mass to 0.01% by mass, or 0.0005% by mass to 0.005% by mass, with the base materials being 100% by mass. When the phosphate ion content is within this range, low electrical conductivity and high metal corrosion prevention (in particular, aluminum corrosion prevention) are achieved.

The coolant composition of the present embodiment contains a metasilicate (component e)). In the coolant composition of the present embodiment, the metasilicate is used as a pH regulator. Due to the metasilicate used as a pH regulator, the electrical conductivity of the coolant composition can be lower than the electrical conductivity attained when commonly used potassium hydroxide or the like is used.

The metasilicate is not particularly limited, may be an alkali metal salt and an alkaline earth metal salt of metasilicic acid, and, in some embodiments, is an alkali metal salt of metasilicic acid, and in some embodiments sodium metasilicate.

In the coolant composition of the present embodiment, the metasilicate content (the content in terms of anhydride) may be such that the pH of the coolant composition can be regulated to a predetermined range, and is usually 0.0005% by mass to 0.05% by mass, with the base materials being 100% by mass.

Other than the above components a) to e), the coolant composition of the present embodiment may contain, as necessary, one or more further additives as long as the effects of the present disclosure are not impaired. The further additives are not particularly limited, and examples include metal corrosion inhibitors (carboxylic acids, nitrates, nitrites, thiazoles, molybdates, and borates), dye, bittering agents, and antifoaming agents. In the coolant composition of the present embodiment, the further additives and the content thereof are selected such that the electrical conductivity of the coolant composition does not exceed 200 $\mu$S/cm. In some embodiments, the total content of the further additives is usually 10% by mass or less, or 5% by mass or less, based on the coolant composition.

The coolant composition of some embodiments is free of a highly electrically conductive $C_5$ to $C_{16}$ aliphatic monobasic acid or an alkali metal salt, ammonium salt, or amine salt thereof. Examples of the $C_5$ to $C_{16}$ aliphatic monobasic acid include heptanoic acid, octanoic acid, nonanoic acid, decanoic acid, undecanoic acid, dodecanoic acid, and mixtures thereof. In one embodiment, the coolant composition of the present embodiment is free of octanoic acid and 2-ethylhexanoic acid as well as alkali metal salts, ammonium salts, and amine salts thereof.

The pH of the coolant composition of some embodiments at 20° C. is 5.5 to 9.0, or 6.0 to 8.0. The pH of the coolant composition can be measured in accordance with JIS K 2234 8.4 pH Value.

The coolant composition of some embodiments has sufficiently low electrical conductivity, and the electrical conductivity is 200 μS/cm or less, or 150 μS/cm or less, at 25° C. The electrical conductivity of the coolant composition can be measured with a personal SC meter SC72 and a detector SC72SN-11 (for pure water) manufactured by Yokogawa Electric Corporation.

The coolant composition of the present embodiment has sufficiently high metal corrosion prevention, and, for example, the aluminum, steel, and brass corrosion preventions are all −0.15 mg/cm$^2$ or more. The corrosion prevention of the coolant composition can be measured directly using the coolant composition as a test solution in accordance with JIS K 2234 8.6 Metal Corrosion Prevention.

In the present embodiment, a method for producing a coolant composition is not particularly limited as long as the effects of the present disclosure are attained, and a common method for producing a coolant composition may be used. For example, the coolant composition can be produced by mixing components a) to d) and, as necessary, the further additives, uniformly stirring the mixture, and regulating the pH to a predetermined level using a metasilicate.

The present embodiment also includes a concentrated coolant composition for obtaining the above coolant composition. The concentrated coolant composition of the present embodiment contains components a), c1), c2), and d) of the above coolant composition and, as necessary, contains water (component b)), a metasilicate pH regulator (component e)), and further additives. The concentrated coolant composition of the present embodiment can be used to obtain the coolant composition of the present embodiment containing components a) to e) by being diluted, for example, 1.1-fold by mass or more and 5-fold by mass or less with water. Accordingly, the concentrated coolant composition of the present embodiment may contain water (component b)) or may not contain water (component b)). When the concentrated coolant composition of the present embodiment contains water, the content thereof is smaller than the water content in the coolant composition.

The coolant composition of some embodiments can be generally used as a coolant, and, since the coolant composition of the present embodiment simultaneously achieves low electrical conductivity and high corrosion prevention, the coolant composition of some embodiments is used as a coolant for HEVs, PHEVs, EVs, and FCVs, or as a coolant for a cooling circuit including a battery of EVs or FCVs. Accordingly, in some embodiments, the coolant composition is a coolant composition for a cooling circuit including a battery.

Below, the present disclosure will now be described more specifically by way of Examples. However, the technical scope of the present disclosure is not limited to these Examples.

Example 1

As base materials, 50.0% by mass of ethylene glycol and 50.0% by mass of ion-exchanged water were used, 0.05% by mass of benzotriazole, 0.0045% by mass of 1-methylimidazole, and 0.0005% by mass of phosphoric acid (in terms of P) were added thereto, the pH of the resulting mixture was regulated to 7.0 with sodium metasilicate, and thus the coolant composition of Example 1 was obtained.

Example 2

As base materials, 50.0% by mass of ethylene glycol and 50.0% by mass of ion-exchanged water were used, 1.0% by mass of tolyltriazole, 0.09% by mass of 1-methylimidazole, and 0.01% by mass of phosphoric acid (in terms of P) were added thereto, the pH of the resulting mixture was regulated to 7.0 with sodium metasilicate, and thus the coolant composition of Example 2 was obtained.

Example 3

As base materials, 50.0% by mass of ethylene glycol and 50.0% by mass of ion-exchanged water were used, 0.18% by mass of tolyltriazole, 0.01% by mass of 1-methylimidazole, and 0.004% by mass of phosphoric acid (in terms of P) were added thereto, the pH of the resulting mixture was regulated to 7.0 with sodium metasilicate, and thus the coolant composition of Example 3 was obtained.

Example 4

The coolant composition of Example 4 was obtained in the same manner as Example 1 except that the amount of 1-methylimidazole added was changed to 0.0005% by mass.

Example 5

The coolant composition of Example 5 was obtained in the same manner as Example 1 except that the amount of benzotriazole added was changed to 0.1% by mass.

Examples 6-8

The coolant compositions of Examples 6, 7, and 8 were obtained in the same manner as Example 2 except that the amount of 1-methylimidazole added was changed to 0.01% by mass, 0.04% by mass, and 0.08% by mass, respectively, and the pH was regulated to 6.5.

Examples 9 and 10

The coolant compositions of Examples 9 and 10 were obtained in the same manner as Example 2 except that the amount of phosphoric acid added was changed to 0.0005% by mass and 0.005% by mass, respectively, and the pH was regulated to 6.5.

Comparative Example 1

The coolant composition of Comparative Example 1 was obtained by using 50.0% by mass of ethylene glycol and 50.0% by mass of ion-exchanged water as base materials, and adding 0.2% by mass of benzotriazole thereto.

Comparative Example 2

The coolant composition of Comparative Example 2 was obtained by using 50.0% by mass of ethylene glycol and 50.0% by mass of ion-exchanged water as base materials, and adding 0.2% by mass of tolyltriazole thereto.

Comparative Example 3

The coolant composition of Comparative Example 3 was obtained by using 50.0% by mass of ethylene glycol and 50.0% by mass of ion-exchanged water as base materials, and adding 0.2% by mass of 1-methylimidazole thereto.

Comparative Example 4

The coolant composition of Comparative Example 4 was obtained in the same manner as Example 3 except that tolyltriazole was not used, and the pH was regulated to 7.2.

Comparative Example 5

The coolant composition of Comparative Example 5 was obtained in the same manner as in Example 3 except that neither phosphoric acid nor the sodium metasilicate which is pH regulator was used.

Comparative Example 6

The coolant composition of Comparative Example 6 was obtained in the same manner as in Example 3 except that 1-methylimidazole was not used.

Comparative Example 7

As base materials, 50.0% by mass of ethylene glycol and 50.0% by mass of ion-exchanged water were used, 0.0005% by mass of phosphoric acid (in terms of P) was added thereto, the pH of the resulting mixture was regulated to 7.2 with sodium metasilicate, and thus the coolant composition of Comparative Example 7 was obtained.

Comparative Example 8

As base materials, 50.0% by mass of ethylene glycol and 50.0% by mass of ion-exchanged water were used, 0.004% by mass of phosphoric acid (in terms of P) was added thereto, the pH of the resulting mixture was regulated to 7.0 with sodium metasilicate, and thus the coolant composition of Comparative Example 8 was obtained.

Comparative Example 9

The coolant composition of Comparative Example 9 was obtained in the same manner as Comparative Example 8 except that potassium hydroxide was used in place of the sodium metasilicate pH regulator.

The electrical conductivity, pH, metal corrosion prevention, and hydrogen producibility from aluminum of the coolant compositions of Examples 1 to 10 and Comparative Examples 1 to 9 were evaluated by the following methods.

Electrical Conductivity

Electrical conductivity was measured at 25° C. with a personal SC meter SC72 and a detector SC72SN-11 (for pure water) manufactured by Yokogawa Electric Corporation.

pH pH was measured in accordance with JIS K 2234 8.4 pH Value at 20° C.

Corrosion Prevention

Corrosion prevention was measured in accordance with JIS K 2234 8.6 Metal Corrosion Prevention. However, the metal was limited to aluminum, steel, and brass, and each coolant composition was directly used as a test solution without using a conditioned solution. Corrosion prevention with respect to aluminum, steel, and brass was regarded as being favorable when $-0.15$ mg/cm$^2$ or more in each case.

Hydrogen Producibility

The apparatus shown in FIG. 1 was used to visually check the amount of produced gas. Specifically, in the apparatus shown in FIG. 1, a test tube was filled with a coolant composition, a test piece cut out from an aluminum radiator tube was placed in the lower part and left to stand still at 45° C. for 120 hours, and the amount of gas produced from the aluminum test piece in the graduated test tube filled with the coolant composition was visually checked. The produced gas was identified as hydrogen by gas chromatograph analysis.

Tables 1 to 4 show the formulations and the evaluation results of the coolant compositions of Examples 1 to 10 and Comparative Examples 1 to 9.

TABLE 1

| | | | Example | | | | |
|---|---|---|---|---|---|---|---|
| | | | 1 | 2 | 3 | 4 | 5 |
| Formulation | a) Ethylene glycol | % by mass | 50.0 | 50.0 | 50.0 | 50.0 | 50.0 |
| | b) Ion-exchanged water | % by mass | 50.0 | 50.0 | 50.0 | 50.0 | 50.0 |
| | c1-1) Benzotriazole | Ratio (% by mass) relative | 0.05 | — | — | 0.05 | 0.1 |
| | c1-2) Tolyltriazole | to a) + b) = 100 | — | 1.0 | 0.18 | — | — |
| | c2) 1-Methylimidazole | | 0.0045 | 0.09 | 0.01 | 0.0005 | 0.0045 |
| | c2/c1 | | 0.090 | 0.090 | 0.056 | 0.010 | 0.045 |
| | d) Phosphoric acid (in terms of P) | Ratio (% by mass) relative to a) + b) = 100 | 0.0005 | 0.01 | 0.004 | 0.0005 | 0.0005 |
| | e) Na metasilicate | | Amount to adjust to pH below | | | | |
| | KOH | | — | — | — | — | — |

TABLE 1-continued

| | | | Example | | | | |
|---|---|---|---|---|---|---|---|
| | | | 1 | 2 | 3 | 4 | 5 |
| Properties | | Electrical conductivity (25° C.)(μS/cm) | 11.0 | 135.9 | 53.6 | 7.1 | 11.1 |
| | | pH (20° C.) | 7.0 | 7.0 | 7.0 | 7.0 | 7.0 |
| Corrosion preventing performance | Aluminum | Measured value (mg/cm$^2$) | −0.03 | 0.00 | 0.02 | −0.02 | 0.00 |
| | | Evaluation | ○ | ○ | ○ | ○ | ○ |
| | Copper | Measured value (mg/cm$^2$) | −0.08 | −0.02 | −0.01 | −0.10 | −0.04 |
| | | Evaluation | ○ | ○ | ○ | ○ | ○ |
| | Brass | Measured value (mg/cm$^2$) | −0.05 | −0.03 | −0.02 | −0.05 | −0.04 |
| | | Evaluation | ○ | ○ | ○ | ○ | ○ |
| Hydrogen producibility (ml) from aluminum | | | Not produced | Not produced | Not produced | Not produced | Not produced |

TABLE 2

| | | | Example | | | | |
|---|---|---|---|---|---|---|---|
| | | | 6 | 7 | 8 | 9 | 10 |
| Formulation | a) Ethylene glycol | % by mass | 50.0 | 50.0 | 50.0 | 50.0 | 50.0 |
| | b) Ion-exchanged water | % by mass | 50.0 | 50.0 | 50.0 | 50.0 | 50.0 |
| | c1-1) Benzotriazole | Ratio (% by mass) relative to a) + b) = 100 | — | — | — | — | — |
| | c1-2) Tolyltriazole | | 1.0 | 1.0 | 1.0 | 1.0 | 1.0 |
| | c2) 1-Methylimidazole | | 0.01 | 0.04 | 0.08 | 0.09 | 0.09 |
| | c2/c1 | | 0.010 | 0.040 | 0.080 | 0.090 | 0.090 |
| | d) Phosphoric acid (in terms of P) | Ratio (% by mass) relative to a) + b) = 100 | 0.01 | 0.01 | 0.01 | 0.0005 | 0.005 |
| | e) Na metasilicate KOH | | — | — | Amount to adjust to pH below — | — | — |
| Properties | | Electrical conductivity (25° C.)(μS/cm) | 78.1 | 107.9 | 128.5 | 64 | 109 |
| | | pH (20° C.) | 6.5 | 6.5 | 6.5 | 6.5 | 6.5 |
| Corrosion preventing performance | Aluminum | Measured value (mg/cm$^2$) | 0.03 | 0.03 | 0.03 | 0.04 | 0.03 |
| | | Evaluation | ○ | ○ | ○ | ○ | ○ |
| | Copper | Measured value (mg/cm$^2$) | 0.01 | 0.02 | 0.01 | 0.01 | 0.01 |
| | | Evaluation | ○ | ○ | ○ | ○ | ○ |
| | Brass | Measured value (mg/cm$^2$) | −0.04 | −0.04 | −0.04 | −0.02 | −0.03 |
| | | Evaluation | ○ | ○ | ○ | ○ | ○ |
| Hydrogen producibility (ml) from aluminum | | | Not produced | Not produced | Not produced | Not produced | Not produced |

TABLE 3

| | | | Comparative Example | | | | |
|---|---|---|---|---|---|---|---|
| | | | 1 | 2 | 3 | 4 | 5 |
| Formulation | a) Ethylene glycol | % by mass | 50.0 | 50.0 | 50.0 | 50.0 | 50.0 |
| | b) Ion-exchanged water | % by mass | 50.0 | 50.0 | 50.0 | 50.0 | 50.0 |
| | c1-1) Benzotriazole | Ratio (% by mass) relative to a) + b) = 100 | 0.2 | — | — | — | — |
| | c1-2) Tolyltriazole | | — | 0.2 | — | — | 0.18 |
| | c2) 1-Methylimidazole | | — | — | 0.2 | 0.01 | 0.01 |
| | c2/c1 | | | | | | 0.056 |

TABLE 3-continued

| | | | Comparative Example | | | | |
| | | | 1 | 2 | 3 | 4 | 5 |
|---|---|---|---|---|---|---|---|
| | d) Phosphoric acid (in terms of P) | Ratio (% by mass) relative to a) + b) = 100 | — | — | — | 0.004 | — |
| | e) Na metasilicate | | — | — | — | Amount to adjust to pH below | — |
| | KOH | | — | — | — | — | — |
| Properties | Electrical conductivity (25° C.)(μS/cm) | | 0.92 | 1.01 | 50 | 20 | 10.0 |
| | pH (20° C.) | | 6.0 | 6.0 | 8.5 | 7.2 | 7.0 |
| Corrosion preventing performance | Aluminum | Measured value (mg/cm$^2$) | 0.02 | 0.02 | −1.53 | −0.53 | 0.02 |
| | | Evaluation | ◯ | ◯ | X | X | ◯ |
| | Copper | Measured value (mg/cm$^2$) | −4.63 | −4.32 | −5.07 | −24.30 | −0.04 |
| | | Evaluation | X | X | X | X | ◯ |
| | Brass | Measured value (mg/cm$^2$) | −0.01 | −0.02 | 0.09 | 0.12 | −0.04 |
| | | Evaluation | ◯ | ◯ | ◯ | ◯ | ◯ |
| Hydrogen producibility (ml) from aluminum | | | 3.00 | 3.10 | 3.00 | 0.50 | 2.1 |

TABLE 4

| | | | Comparative Example | | | |
| | | | 6 | 7 | 8 | 9 |
|---|---|---|---|---|---|---|
| Formulation | a) Ethylene glycol | % by mass | 50.0 | 50.0 | 50.0 | 50.0 |
| | b) Ion-exchanged water | % by mass | 50.0 | 50.0 | 50.0 | 50.0 |
| | c1-1) Benzotriazole | Ratio (% by mass) relative to a) + b) = 100 | — | — | — | — |
| | c1-2) Tolyltriazole | | 0.18 | — | — | — |
| | c2) 1-Methylimidazole | | — | — | — | — |
| | c2/c1 | | | | | |
| | d) Phosphoric acid (in terms of P) | Ratio (% by mass) relative to a) + b) = 100 | 0.004 | 0.005 | 0.004 | 0.004 |
| | e) Na metasilicate | | Amount to adjust to pH below | | | — |
| | KOH | | — | — | — | Amount to adjust to pH below |
| Properties | Electrical conductivity (25° C.)(μS/cm) | | 54.7 | 5.0 | 38.0 | 52.2 |
| | pH (20° C.) | | 7.0 | 7.2 | 7.0 | 7.0 |
| Corrosion preventing performance | Aluminum | Measured value (mg/cm$^2$) | 0.03 | 0.03 | 0.06 | 0.02 |
| | | Evaluation | ◯ | ◯ | ◯ | ◯ |
| | Copper | Measured value (mg/cm$^2$) | −3.18 | −1.80 | −1.70 | −1.60 |
| | | Evaluation | X | X | X | X |
| | Brass | Measured value (mg/cm$^2$) | −0.05 | −0.31 | −2.30 | −5.40 |
| | | Evaluation | ◯ | X | X | X |
| Hydrogen producibility (ml) from aluminum | | | Not produced | — | Not produced | Not produced |

As shown in Tables 1 to 4, the coolant compositions of Examples 1 to 10 containing a triazole compound, an imidazole compound, and a phosphate ion had high metal corrosion prevention and low hydrogen producibility while having low electrical conductivity.

According to Comparative Examples 1 and 2, when a triazole compound was solely added to the base materials, steel corrosion prevention was poor, and hydrogen was produced in the hydrogen producibility test. According to Comparative Example 3, when an imidazole compound was solely added to the base materials, aluminum and steel corrosion prevention was poor, and hydrogen was produced in the hydrogen producibility test. According to Comparative Examples 7 and 8, when phosphoric acid was added to the base materials, and the pH was regulated with sodium metasilicate, steel and brass corrosion prevention was poor, and hydrogen was produced in the hydrogen producibility test. Comparison of Comparative Examples 8 and 9 revealed that electrical conductivity was increased by changing the pH regulators from sodium metasilicate to potassium hydroxide.

Moreover, comparison of Example 3 and Comparative Example 4 revealed that due to the triazole compound contained in the coolant composition, aluminum and steel corrosion prevention was improved, and production of hydrogen was suppressed in the hydrogen producibility test. Comparison of Example 3 and Comparative Example 5 revealed that due to the phosphate ion contained in the coolant composition, production of hydrogen was suppressed in the hydrogen producibility test. Comparison of Example 3 and Comparative Example 6 revealed that due to the imidazole compound contained in the coolant composition, the steel corrosion prevention was improved.

According to Examples 2 and 6 to 8, a smaller ratio of the imidazole compound content to the triazole compound content (c2/c1) tends to result in a lower electrical conductivity of the coolant composition, and a c2/c1 ratio of less than 0.1 results in a significantly low electrical conductivity.

The invention claimed is:

1. A coolant composition comprising:
an alcohol;
water;
a triazole compound;
an imidazole compound;
a phosphate ion; and
a metasilicate,
wherein a ratio of a content of the imidazole compound to a content of the triazole compound is less than 0.1,
wherein the coolant composition comprises:
from 40 wt. % to 60 wt. % of the alcohol;
from 40 wt. % to 60 wt. % of the water;
from 0.05 wt. % to 0.5 wt. % of the triazole compound;
from 0.0005 wt. % to 0.04 wt. % of the imidazole compound;
from 0.0005 wt. % to 0.005 wt. % of the phosphate ion (in terms of P); and from 0.0005 wt. % to 0.005 wt. % of the metasilicate, on the basis of the total weight of the composition.

2. The coolant composition of claim 1, wherein the ratio of the content of the imidazole compound to the content of the triazole compound is less than or equal to 0.09.

3. The coolant composition of claim 1, wherein the ratio of the content of the imidazole compound to the content of the triazole compound is less than or equal to 0.08.

4. The coolant composition of claim 1, wherein:
the triazole compound comprises tolyltriazole, benzotriazole, or both;
the imidazole compound comprises 1-methylimidazole;
the phosphate ion is derived from phosphoric acid; and
the metasilicate is sodium metasilicate.

5. The coolant composition according to claim 1, wherein the coolant composition has a pH of 5.5 to 9.0.

6. The coolant composition according to claim 1, wherein the coolant composition is for a cooling circuit comprising a battery.

7. The coolant composition according to claim 1, wherein the coolant composition has an electrical conductivity of 200 μS/cm or less at 25° C.

8. The coolant composition of claim 1, wherein the coolant composition has an electrical conductivity of 150 μS/cm or less at 25° C.

9. The coolant composition of claim 1 consisting of:
the alcohol;
the water;
the triazole compound;
the imidazole compound;
the phosphate ion; and
the metasilicate.

* * * * *